United States Patent [19]
Stelzer

[11] 3,753,631
[45] Aug. 21, 1973

[54] PISTON MACHINE
[76] Inventor: Adolf Stelzer, 176-4, Daiba, A-8605 Kaptenberg, Austria
[22] Filed: Oct. 12, 1971
[21] Appl. No.: 188,255

[30] Foreign Application Priority Data
Oct. 12, 1970 Austria.................................. 29132

[52] U.S. Cl............................ 418/3, 418/5, 418/13, 418/49, 123/8.41
[51] Int. Cl. ...... F01c 1/02, F01c 11/00, F04c 23/00
[58] Field of Search.................. 418/3, 5, 13, 49–53; 123/8.41; 73/253; 417/247

[56] References Cited
UNITED STATES PATENTS

| 366,894 | 7/1887 | Smith | 418/51 |
|---|---|---|---|
| 2,509,790 | 5/1950 | Stephenson | 418/49 |
| 2,496,668 | 2/1950 | Manseau | 418/49 |
| 2,292,631 | 8/1942 | Granberg | 73/253 |
| 3,156,222 | 11/1964 | Miller | 418/68 |
| 3,102,517 | 9/1963 | Day et al. | 418/53 |
| 2,489,041 | 11/1949 | Manseau | 418/49 |

*Primary Examiner*—Carlton R. Croyle
*Assistant Examiner*—John J. Vrablik
*Attorney*—Woodhams, Blanchard & Flynn

[57] ABSTRACT
A piston machine comprising a casing having a hemispherical internal surface and a substantially plane internal surface, a piston body mounted in said casing and comprising a spherical segment and a conical member, having an obtuse apex angle, mounted on the piston body, the centre of the spherical segment coinciding with the theoretical apex of the conical member, the spherical segment bearing against the hemispherical internal surface, the said substantially plane internal surface passing through the centre of the conical member, at least one plate projecting radially from the piston body and lying sealingly against the casing, said at least one plate subdividing the said substantially plane internal surface, the conical member having a generatrix disposed at least closely adjacent to the substantially plane internal surface of the casing and adapted to perform a wobbling or gyrating movement thereon, a pin extending outwardly of the spherical segment and connected thereto, the axis of the pin coinciding with the axis of the conical member, a shaft mounted in the casing, the shaft being perpendicular to the substantially plane internal surface, the shaft being disposed at an acute angle to the axis of the pin, the sum of the said acute angle together with the obtuse apex angle of the conical member amounting to 180°, and a crank disc on the shaft, the crank disc having, on one side of the centre thereof, a bore in which the piston body pin is rotatably mounted, whereby, when the piston body performs a rolling movement in relation to the substantially plane internal surface, the pin imparts a rotary movement to the crank disc and hence to the shaft, and vice versa.

2 Claims, 5 Drawing Figures

Patented Aug. 21, 1973

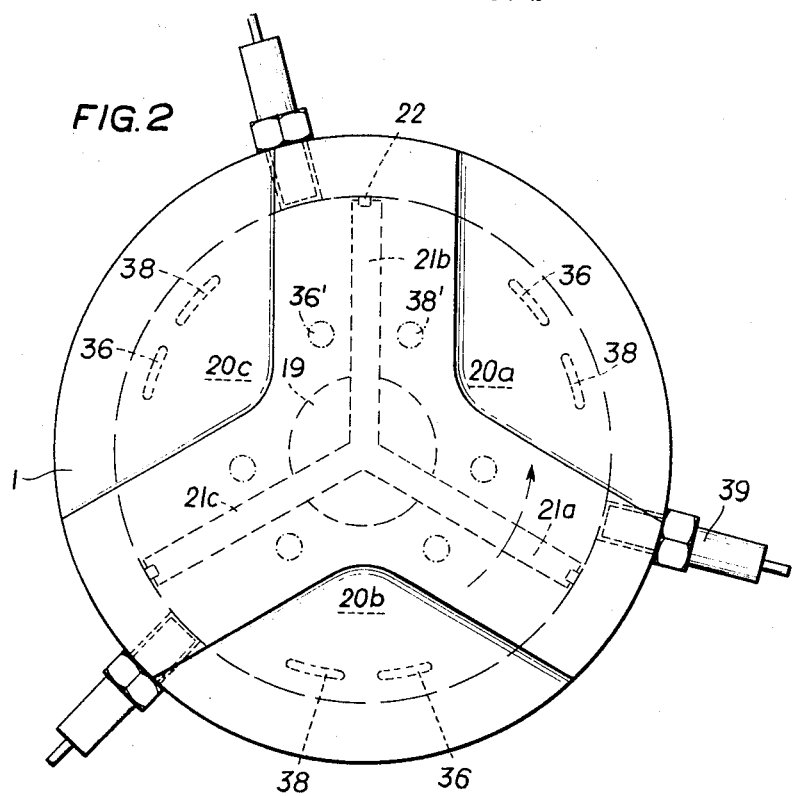
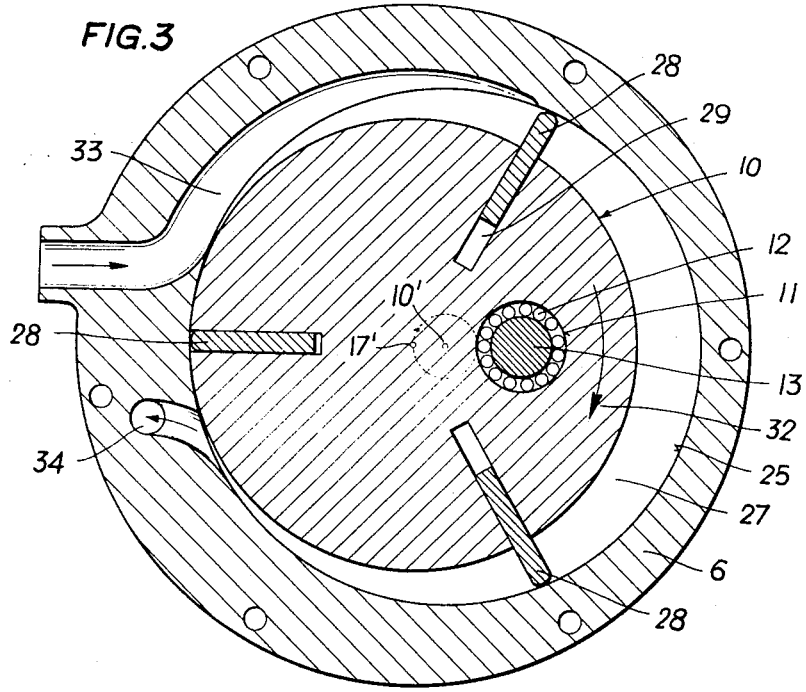

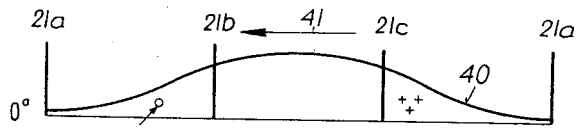
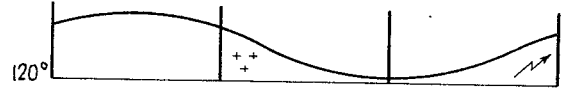
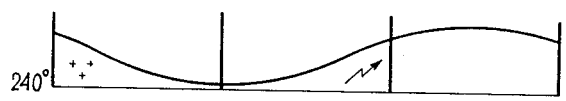
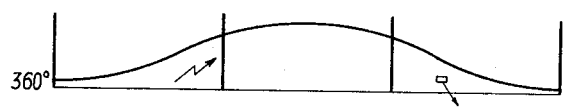
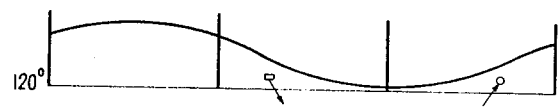
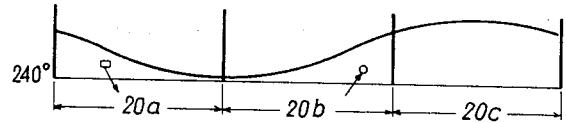
FIG. 4
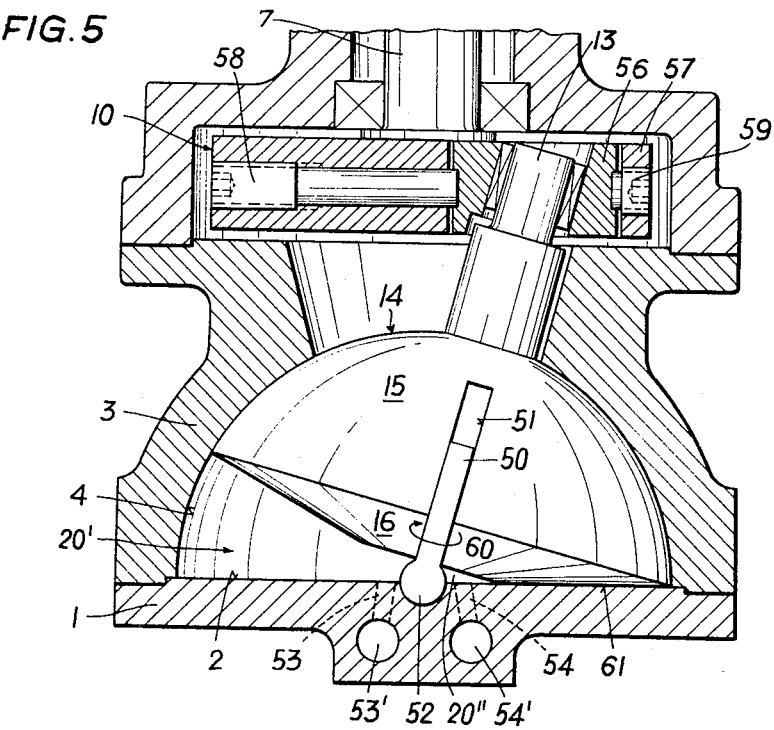
FIG. 5

PISTON MACHINE

The invention relates to a piston machine for energy conversion, which can be constructed as an internal combustion engine or compressed gas engine, as a compressor for gaseous media and also as a liquid pump, and which has the advantage over most usual piston machines that there is no reciprocating piston movement which has to be converted into a rotary movement of the crankshaft with loss of energy.

According to the present invention there is provided a piston machine comprising a casing within which is mounted a piston body, the piston body comprising a spherical segment and a cone or truncated cone, having an obtuse apex angle, mounted on the piston body, the centre of the spherical segment coinciding with the theoretical apex of the cone, the spherical segment bearing against a hemispherical internal surface which is provided on the casing, the casing having a substantially plane internal surface which passes through the centre of the cone and is subdivided by at least one plate projecting radially from the piston body and lying sealingly against the casing, the cone or truncated cone having a generatrix disposed at least closely adjacent to the substantially plane surface of the casing and adapted to perform a wobbling movement thereon, a pin extending outwardly of the spherical segment and connected thereto, the axis of the pin coinciding with the axis of the cone or truncated cone, a shaft mounted in the casing, the shaft being perpendicular to the substantially plane internal surface, the shaft being disposed at an acute angle to the axis of the pin, the sum of the said acute angle together with the obtuse apex angle of the cone or truncated cone amounting to 180°, and a crank disc on the shaft which on one side of the centre thereof has a bore in which the piston body pin is rotatably mounted, whereby, when the piston body performs a wobbling movement in relation to the substantially plane internal surface, the pin imparts a rotary movement to the crank disc and hence to the shaft, and vice versa.

In a piston machine of this kind it is convenient for the piston body to be mounted not only in the crank disc but also direct on the casing. For this purpose, in the region of the cone apex of the piston body there may be disposed a second, projecting spherical segment body which has a centre-angle of slightly more than 180° and the centre of which coincides with the theoretical apex of the cone, while in the said plane surface there may be provided in the centre thereof a corresponding depression in which the second spherical segment is mounted.

When the machine is to be in the form of an internal combustion engine, the cavity, serving as working chamber or stroke chamber, between the piston body and the casing wall surrounding it may be divided into two or more chambers through the provision on the periphery of the piston body of at least two radially projecting plates which seal the cavity both on the hollow spherical surface and on the plane surface of the casing.

Examples of construction of the piston machine according to the invention are explained more fully below with reference to the accompanying drawings, in which:

FIG. 2 is a diagrammatical view from below of the motor shown in FIG. 1,

FIG. 3 is a section on the line III—III in FIG. 1,

FIG. 4 is a diagram explaining the operation of the machine shown in FIG. 1 and 2 when acting as a four-stroke engine, and FIG. 5 is an axial centre section of a compressor or piston pump.

Figure 1:
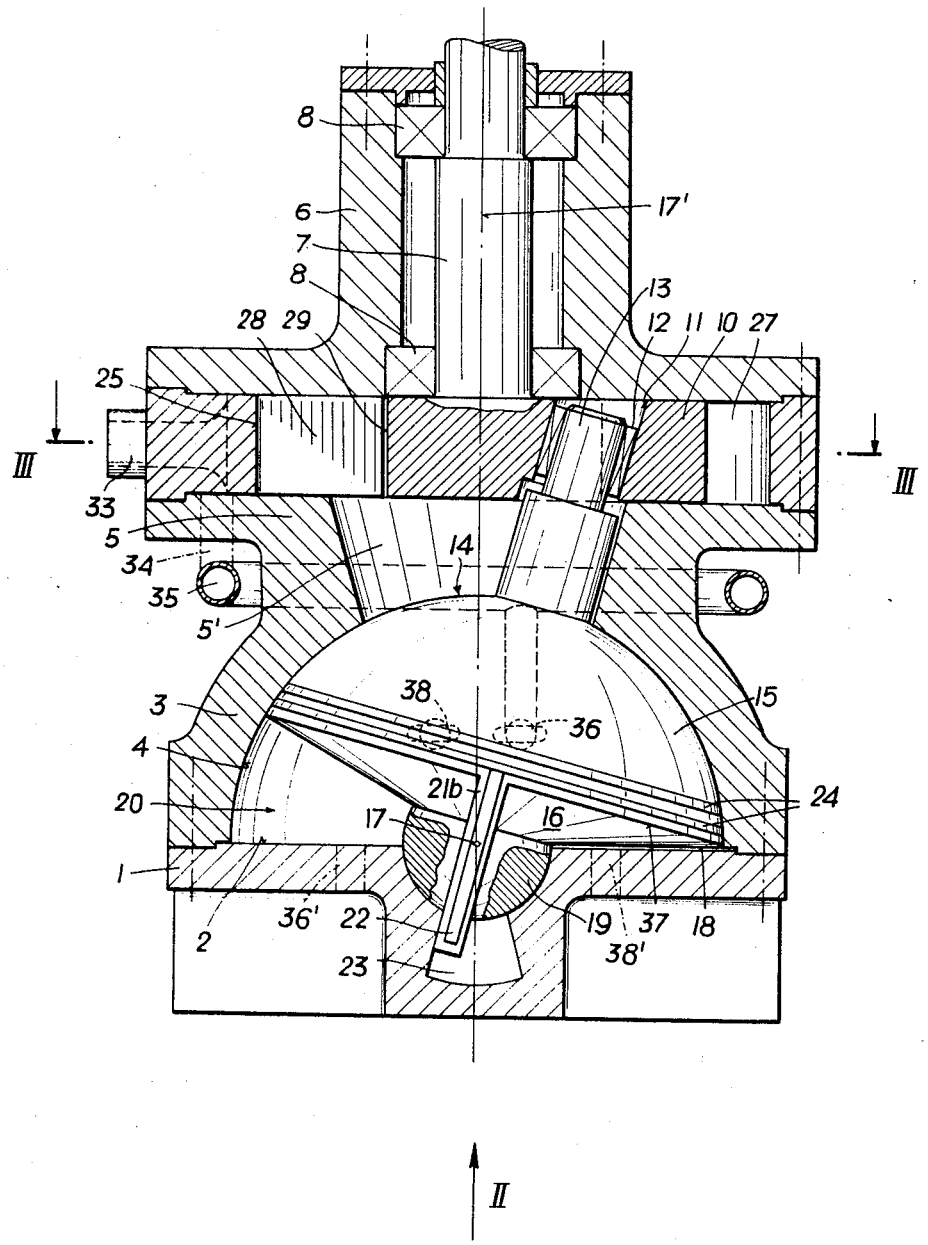
FIG. 1 is an axial centre section of an internal combustion engine.

The internal combustion engine illustrated in FIGS. 1 to 3 has a lower casing part 1, provided with a plane internal surface 2, and an upper casing part 3, the internal surface 4 of which has the shape of a hollow hemisphere. An upper casing part 5 is provided with a recess 5'. The recess 5' widens coincally upwards and finally the casing part 5 merges into a bearing bush 6. A main engine shaft 7 is mounted at two points in the bearing bush 6 by means of bearings 8. A crank disc 10, which will be described more fully in connection with FIG. 3, is fastened to the main shaft 7.

The crank disc 10 has an eccentric cut-out 11 disposed at an angle of about 15° in relation to the axis 17' of the main shaft 7. The cut-out 11 is provided with a bearing 12 in which a pin 13 of a piston body 14 is mounted for easy rotation.

The piston body 14 consists of a spherical segment 15, the centre-angle of which amounts to about 150°, and a truncated cone 16 the apex angle of which likewise amounts to 150°. The truncated cone 16 has a theoretical apex 17 which is disposed in the plane of the surface 2, the apex 17 constituting the centre of the spherical segment 15. On the truncated cone 16 there is in addition attached a small spherical segment 19, which has a centre-angle of about 210° and the centre of which likewise lies in the apex 17. The arrangment is such that the piston body 14 always has a generatrix 18 thereof disposed parallel to the plane surface 2, but is a short distance from that plane and thus leaves a gap open. The piston body 14 does not perform a rotating movement but a wobbling or gyrating movement in relation to the plane surface 2. During this wobbling movement, the axis of the pin 13 describes a cone about the axis 17' of the main shaft 7 and thereby rotates the crank disc 10, in which it is mounted by means of the bearings 12, so that both the crank disc 10 and the main shaft 7 perform a rotating movement.

During the wobbling movement of the piston body 14, there is formed between it and the casing wall surfaces 2 and 4 a wedge-shaped working or stroke chamber 20 which travels continously around in a circle and which receives the working medium, that is to say the combustible gas mixture in the case of an internal combustion engine. The working chamber 20 is divided by three radially projecting plates 21a, 21b, 21c, which are fastened on the piston body with an angular spacing of 120° therebetween, into three sectors 20a, 20b, 20c, each with a centre-angle of 120°. In order to ensure that the piston body is not obstructed in its wobbling movement by the plates 21, and to ensure that the individual sectors 20a, 20b and 20c are sealed in relation to one another, the plates 21a, 21b, 21c, are provided with seals 22. The plates 21 pass through accurately fitting slots in the plane surface 2, and project into downwardly widening recesses 23 in the lower casing part 1. In order also to seal the working chamber at the top, suitable piston rings 24 are provided on the spherical segment 15.

In the machine illustrated in FIGS. 1 to 3 the crank disc 10 is in the form of a rotor of a precompressor for the gas or gas mixture to be burned. The casing part 5 has an eccentrically situated cylindrical bore 25, so that between the crank disc 10, which is disposed centrally in the casing, and the latter there is formed a crescent-shaped space 27. The space 27 is subdivided by three sliding elements 28 which are inserted in recesses 29 in the crank disc 10 so as to be radially movable therein, each sliding element 28 in operation being pressed by centrifugal force or by springs (not shown) against the casing wall 25 bounding the cavity 27. The crescent-shaped chamber 27 is thus divided into three sectors which, in the direction of the arrow 32, during the rotation of the crank disc are periodically first enlarged to a maximum and then reduced again to a minimum. An induction port 33 is connected to one side of the crescent-shaped chamber 27 and an exhaust port 34 to the other side. The induction port 33 communicates with each said sector while the latter is increasing in size, while the exhaust port 34 communicates with each said sector while the latter is decreasing in size.

When the machine is used as a two-stroke internal combustion engine, the air-gas mixture is first drawn in by suction by the crank disc, operating as a rotary-piston pump, is precompressed, and is then fed to a ring pipe 35 which extends around the casing part 3. From the pipe 35 the gas mixture passes to three inlet slots 36 (FIG. 2) which are disposed on the periphery of the hollow spherical surface 4 at a height such that they can be controlled by the edge 37 at which the spherical segment 15 adjoins the conical portion of the truncated cone 16. Outlet slots 38, which are likewise controlled by the edge 37, are also situated on this spherical hollow surface. Three sparking plugs 39 are provided on the casing part 3. During the wobble movement of the piston at 360°, the displacement sectors 20a, 20b, 20c are in their volumes periodically reduced and increased. Shortly after reaching the greatest volume of the displacement sector, the inlet slot 36 is released by the controlling edge 37 and a gas mixture flows in from the pre-compressor. The gas mixture is then compressed and shortly after reaching the smallest volume, ignition occurs and thereafter expansion occurs, whereby the volume of the sector is enlarged upon a continued movement of the piston 14. Shortly before the greatest volume is achieved, the exhaust slot 38 is released by the controlling edge so that the combustion exhaust gases can flow out. Then the cycle repeats again. The inlet and exhaust slots 36, 38 are arranged closely side-by-side, however, are controlled by the edge 37 in such a manner that they are never open at the same time.

When the machine is to be used as a four-stroke internal combustion engine, the slots 36 and 38 are not provided but are replaced by valve controlled inlet and outlet openings 36' and 38' in the casing part 1. The operation of the four-stroke internal combustion engine will be described more fully with reference to FIG. 4, in which the curve 40 represents with respect to the horizontal axis the variation of size of the sectors 20a, 20b and 20c of the working chamber which occurs when the piston moves twice through 360°. In FIG. 4, vertical lines also symbolise the three plates 21a 21b and 21c between which the sectors of the working chamber 20 lie, these sectors periodically changing their size during the movement of the piston through 360°. When the piston body 14 wobbles in the direction of the arrow 41 (FIG. 4), the distribution shown in the uppermost diagram should for example be obtained at zero degrees. In the first sector 20a, which gradually increases in size, induction starts. In the second sector 20b the end of induction is reached, and in the third sector 20c compression begins.

After a wobbling movement through 120°, the end of induction is reached in the sector 20a compression takes place in the sector 20b, and ignition and expansion of the gas mixture takes place in the sector 20c.

After wobbling has been effected through 240°, compression take place in the first sector 20a in sector 20b ignition is effected and expansion begins, while in sector 20c the end of the expansion is already reached. When the wobbling movement has extended over 360°, the condition is reached in which ignition and expansion take place in the first sector 20a, the end of the expansion is reached in the second sector 20b, and the exhaust is opened in the sector 20c.

The second wobbling cycle, which is symbolised by the bottom three diagrams in FIG. 4, now begins. When wobbling has extended over 120°, the expansion ends in the first sector, the exhaust is open in the second partial chamber, and induction commences in the third. When rolling has extended over 240°, the exhaust is opened in the first sector, induction commences in the second sector, and induction is completed in the third sector. After a full rolling movement over 360° the conditions illustrated in the uppermost diagram are once again achieved.

As can be seen this machine works like a four-stroke internal combustion engine with three pistons, which are offset in their crank radii by 120° in relation to one another. Very uniform distribution of torque over the entire cycle is thus achieved.

It is also immediately possible for a machine of this kind to be operated as a compressor for gaseous media, in which case the crank disc 10 works as a precompressor and the piston body as a main compressor.

Instead of three radially projecting dividing plates 21 it is also possible to provide only two such plates, or else more than three, namely four or more, in which case the outlet and inlet apertures, which are for example controlled by valves, must naturally be distributed on the periphery in accordance with the arrangement in a four-stroke engine in order to obtain the desired result.

FIG. 5 shows a form of construction of the piston engine according to the invention which can be used as a compressor or pump, and in which the unchanged parts, particularly the piston body composed of a spherical segment 15 and a truncated cone 16, the crank disc 10, and the main shaft 7, are given the same reference numerals. Here however the spherical segment 19 is not used and, instead of the downwardly projecting plates 21, only a single upwardly projecting plate 50 is provided. The latter is inserted into a corresponding slot 51 in the spherical segment 15 and at its bottom end is pivotally mounted by means of a ball and socket 52 disposed in the plane of the surface 2. The plate 50 also bears sealingly against the hollow spherical surface 4 of the casing.

Close to the dividing plate 50 there are provided in the lower part of the casing an induction opening 53 and an exhaust opening 54, these openings being connected to induction and pressure pipes 53' and 54' respectively. The usual non-return valve or pressure valve (not shown) is provided in the pressure pipe. The crank disc 10 is in this case not constructed as a pre-compressor, but serves solely to transmit the rotational driving movement from the main shaft 7 to the piston body 14. In order to permit accurate adjustment of the correct inclined position of the piston pin 13 in relation to the main shaft 7, a piston pin 13 is here mounted in a slide guide 56 which is mounted for radial sliding in the main part 57 of the crank disc 10 and is provided with threaded bores in which screws 58, 59 are disposed, these screws lying diametrically opposite one another and acting by their inner ends on the slide guide 56.

The operation of this machine is as follows. The working chamber situated between the piston body 14 and the enclosing casing walls is here divided into two working chambers 20' and 20''. The working chamber 20' begins on the left-hand side of the dividing plate 50 and extends to the sealing edge 61 of the piston body. The second working chamber 20'' extends from the sealing edge 61 of the piston body to the right-hand side of the dividing plate 50. When the piston body now wobbles in the direction of the arrows 60 on the plane surface 2, the dividing plate 50 always remaining on the same side and performing only a pendulum movement about the pin 52 acting as joint, each of the two working chambers 20' and 20''- starting from an initial position in which the sealing edge 61 coincides with the foot of the dividing plate 50 - first increases to a maximum and then is reduced again to a minimum. As long as the working chamber 20' increases in size the medium to be delivered is therefore drawn in through the induction opening 53, and at the same time the working chamber 20'' is gradually reduced in size and forces the medium into the exhaust opening 34.

The embodiments of the invention in which an exclusive property or privilege is claimed are defined as follows:

1. A piston machine comprising a casing having a hemispherical internal surface and a substantially plane internal surface, a piston body mounted in said casing and comprising a spherical segment and a conical member, having an obtuse apex angle, mounted on the piston body, the center of the spherical segment coinciding with the theoretical apex of the conical member, the spherical segment bearing against the hemispherical internal surface, the said substantially plane internal surface passing through the center of the conical member, at least one plate projecting radially from the piston body and lying sealingly against the casing, said at least one plate subdividing the said substantially plane internal surface, the conical member having a generatrix disposed near to the substantially plane internal surface of the casing and adapted to perform a wobbling movement thereon, a pin extending outwardly of the spherical segment and connected thereto, the axis of the pin coinciding with the axis of the conical member, a shaft mounted in the casing, the shaft being perpendicular to the substantially plane internal surface, the shaft being disposed at an acute angle to the axis of the pin, the sum of the said acute angle together with the obtuse apex angle of the conical member amounting to 180°, and a crank disc on the shaft, the crank disc having, on one side of the center thereof, a bore in which the piston body pin is rotatably mounted, whereby, when the piston body performs a wobbling movement in relation to the substantially plane internal surface, the pin imparts a rotary movement to the crank disc and hence to the shaft, and vice versa, said crank disc and the part of the casing surrounding the latter define a compressor for a gaseous medium.

2. A piston machine according to claim 1, wherein plate-shaped sliding elements are inserted with radial adjustability in radial slots in the crank disc, the outer ends of these sliding elements being in operation urged against the casing wall, and these sliding elements dividing a crescent-shaped space between the crank disc and the casing into a plurality of chambers the volume of which is periodically increased and then reduced again during the rotation of the crank disc, there being provided an induction port for the gaseous medium which communicates with a said chamber while the latter is increasing in size, and an exhaust port which communicates with a said chamber while the latter is decreasing in size.

* * * * *